United States Patent
Chari

(10) Patent No.: US 8,134,984 B2
(45) Date of Patent: Mar. 13, 2012

(54) CONVERSION OF ACCESS NODES TO GATEWAYS WITHIN A WIRELESS MESH NETWORK

(75) Inventor: Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 694 days.

(21) Appl. No.: 11/700,513

(22) Filed: Jan. 31, 2007

(65) Prior Publication Data

US 2008/0181124 A1 Jul. 31, 2008

(51) Int. Cl.
*H04W 4/00* (2009.01)

(52) U.S. Cl. ........ 370/338; 370/312; 370/401; 370/327; 455/520

(58) Field of Classification Search ................ 370/338, 370/312, 401, 327; 455/520
See application file for complete search history.

(56) References Cited

U.S. PATENT DOCUMENTS

| | | | |
|---|---|---|---|
| 6,104,928 A | 8/2000 | Waugh | |
| 6,418,138 B1 | 7/2002 | Cerf et al. | |
| 6,583,767 B1 | 6/2003 | Fitz | |
| 2005/0153725 A1* | 7/2005 | Naghian et al. | 455/520 |
| 2006/0062154 A1 | 3/2006 | Choy et al. | |
| 2006/0251115 A1 | 11/2006 | Haque et al. | |
| 2007/0025353 A1* | 2/2007 | Nambisan et al. | 370/392 |
| 2007/0204046 A1* | 8/2007 | Batta et al. | 709/226 |
| 2007/0214379 A1* | 9/2007 | Abraham et al. | 714/4 |
| 2007/0253341 A1* | 11/2007 | Atkinson et al. | 370/252 |
| 2007/0299950 A1* | 12/2007 | Kulkarni | 709/223 |
| 2008/0170527 A1* | 7/2008 | Lundsgaard et al. | 370/312 |
| 2009/0037600 A1* | 2/2009 | Chandrayana et al. | 709/239 |
| 2009/0310488 A1* | 12/2009 | Mighani et al. | 370/235 |

* cited by examiner

*Primary Examiner* — Barry Taylor
(74) *Attorney, Agent, or Firm* — Brian R. Short

(57) ABSTRACT

An apparatus and method of a method of a wireless mesh network proposing access nodes for conversion to gateways is disclosed. The method includes each access node of the wireless mesh network measuring wireless mesh network metrics. A server connected to the wireless mesh network obtains the network metrics, and calculates a desirability of conversion of at least one access node to a gateway based upon the network metrics. An apparatus and method of a server of a wireless mesh network calculating which access nodes of the wireless mesh network should be converted to gateways is also disclosed. The method includes the server receiving wireless mesh network metrics from the access nodes, and calculating which of the access nodes should be converted based upon the network metrics.

24 Claims, 5 Drawing Sheets

The server receiving wireless mesh network metrics from the access nodes

510

The server calculating which of the access nodes should be converted based upon the network metrics

520

CONVERSION OF ACCESS NODES TO GATEWAYS WITHIN A WIRELESS MESH NETWORK

FIELD OF THE INVENTION

The invention relates generally to wireless communications. More particularly, the invention relates to a method and apparatus for determining access node candidates for conversion to gateways within a wireless mesh network.

BACKGROUND OF THE INVENTION

Wireless mesh networks are gaining popularity because wireless infrastructures are typically easier and less expensive to deploy than wired networks. The wireless mesh networks typically include wired gateways that are wirelessly connected to wireless nodes, or wirelessly connected directly to client devices. Many wireless nodes can collectively form a wireless mesh, in which client devices can associate with any of the wireless nodes. A gateway is a mesh access node that is connected to a backhaul connection. A cluster is a set of access nodes that select routing paths through a particular gateway.

Wireless mesh architectures are economical compared to the alternative wireless networks since they do not require running backhaul to every access node. Only a fraction of the access nodes require backhaul and these are termed gateways. The backhaul can take the form of a T-1 or fiber or point-to-point, or point-to-multipoint wireless links. One commonly used option is to deploy a few point-to-multipoint base-stations at tall buildings or elevated tower locations. Based on the availability of line-of-sight from these locations, a fraction of the access nodes can be connected to subscriber modules linking up to a base-station, thereby converting them to gateways.

After a network has been deployed with access nodes and gateways, it is desirable to have a method for identifying those access nodes which, if they were converted to gateways, would improve system capacity, end-user throughputs and balance the traffic loads across the network.

SUMMARY OF THE INVENTION

One embodiment of the invention includes a method of a wireless mesh network proposing access nodes for conversion to gateways. The method includes each access node of the wireless mesh network measuring wireless mesh network metrics. A server connected to the wireless mesh network obtains the network metrics, and calculates a desirability of conversion of at least one access node to a gateway based upon the network metrics.

Another embodiment includes a method of a server of a wireless mesh network calculating which access nodes of the wireless mesh network should be converted to gateways. The method includes the server receiving wireless mesh network metrics from the access nodes, and calculating which of the access nodes should be converted based upon the network metrics.

Other aspects and advantages of the present invention will become apparent from the following detailed description, taken in conjunction with the accompanying drawings, illustrating by way of example the principles of the invention.

DETAILED DESCRIPTION

Figure 1:
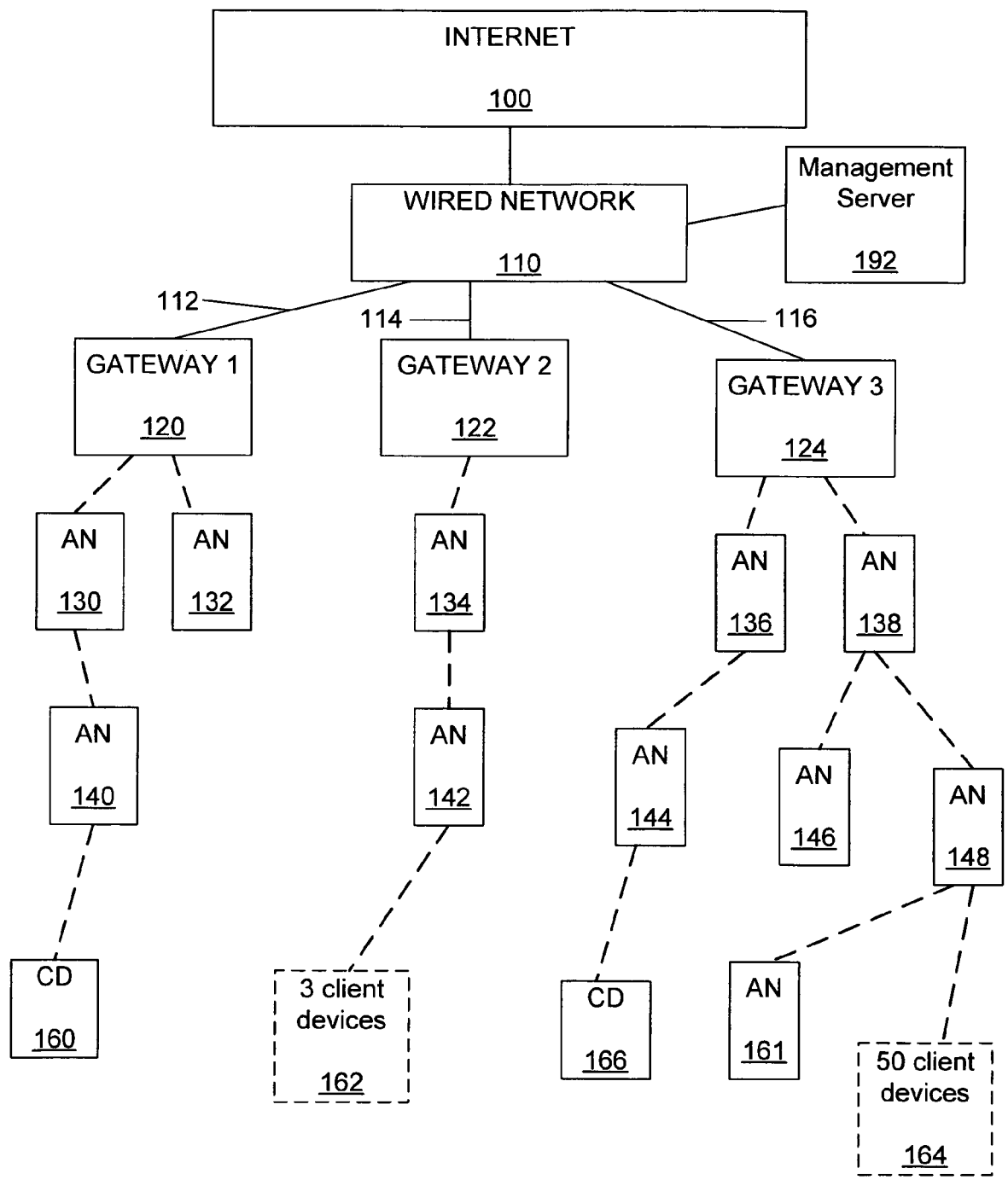
FIG. 1 shows an example of a wireless mesh network that includes gateways and access nodes.

As shown in the drawings for purposes of illustration, the invention is embodied in methods for proposing, selecting, calculating or recommending access nodes of a wireless mesh network that can be converted to gateways. Conversion of the access nodes to gateways can improve the performance of the wireless mesh network by, for example, balancing loading of backhaul connections of the wireless mesh network, by increasing system capacity or improving end-user throughputs.

FIG. 1 shows an example of a wireless mesh network that includes gateways and access nodes. The gateways 120, 122, 124 are mesh access nodes that are connected through backhaul connections 112, 114, 116 to a wired network 110. The backhaul connections 112, 114, 116 can be a T-1, a fiber link, a point-to-multipoint wireless link, a point-to-point wireless link or a link using another backhaul technology. The wired network 110 can be connected, for example, to the internet 100.

The gateways 120, 122, 124 along with access nodes form clusters. Each cluster is a set of access nodes that select routing paths through a particular gateway, forming the cluster. The size of the clusters and the number of client devices connected to the access nodes of the clusters determines the loading of the backhaul connections 112, 114, 116.

The wireless mesh network includes first-order access nodes 130, 132, 134, 136, 138 that are connected to the gateways 120, 122, 124. The access nodes 130, 132, 134, 136, 138 connect to the gateways 120, 122, 124 through routing selection protocols. One example of a routing protocol includes the gateways 120, 122, 124 originating and broadcasting routing beacons that are received by the first-order access nodes 130, 132, 134, 136, 138. The first first-order access nodes 130, 132, 134, 136, 138 select an upstream router based upon a quality of the link between the first-order access node and the upstream gateways. One method of determining the link quality includes, at least in part, monitoring a persistence of successfully received routing beacons. The upstream gateway providing a first-order access node with the highest persistence of successfully received routing beacons can be selected as the upstream gateway. For one embodiment, the first-order access nodes attach additional access node identifying information to the routing beacons before re-broadcasting the successfully received routing beacons. Another embodiment includes the access node incrementing a hop-counter that is included within the re-broadcast routing beacons so that each access node knows how many wireless hops it is away from a gateway.

The wireless mesh network further includes second order access nodes 140, 142, 144, 146, 148 which have selected upstream first-order access nodes 130, 134, 136, 138 as routing paths to an upstream gateway 120, 122, 124. As previously stated, one method of selecting upstream devices (gateway or access node) includes selecting the upstream device that provides the highest persistence of successfully received routing beacons. For one embodiment, the second-order access nodes attach additional access node identifying information to the routing beacons before re-broadcasting the successfully received routing beacons. As previously stated, another embodiment includes the access node incrementing a hop-counter that is included within the re-broadcast routing beacons so that each access node knows how many wireless hops it is away from a gateway.

The wireless mesh network further includes a third-order access node 152. Typically, similar routing techniques are used for the third-order access nodes as the other order access nodes. It is to be understood that the wireless mesh network can include any number of access nodes and gateways. Further, many different types of routing selection techniques that include those described, as well as other routing techniques that have not been described, can be used by the wireless mesh networks disclosed.

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network.

FIG. 1 shows client devices 160, 161 connected to access nodes 140, 144, thereby providing the client devices 160, 161 access to the internet 100. FIG. 1 also includes client device groups 162, 164 which represent large numbers of client devices simultaneously connected to corresponding access nodes 142, 148. Large numbers of client devices being connected to a few access nodes can cause loading of the wireless mesh network to be imbalanced. These client device imbalances can cause load imbalances of the backhaul connections 112, 114, 116.

Some access nodes may be multiple wireless hops from a gateway. If such a access node has a large number of users or is experiencing heavy usage, the resulting traffic has to transit multiple hops, thereby consuming wireless airtime over each of those hops. It may be desirable to convert such an access node to a gateway to reduce airtime utilization, improve system capacity and increase end-user throughput for users connected through the access node. Similarly, an access node may be in the routing path for a number of downstream access nodes. In such a case, this access node may represent a traffic chokepoint and could advantageously be converted to a gateway. Some access nodes may have poor mesh links because of a variety of reasons including radio frequency propagation characteristics. This manifests itself in high latencies to the Internet or low upstream or downstream throughputs between the access node and its cluster's gateway. If such an access node is converted to a gateway, all clients connected to the access node as well as other access nodes further downstream that route through this access node, are positively benefited.

A routing table for each gateway is generated providing each gateway with a selected route to every device (mesh access node or client device) within the cluster of the gateway. Each access node that selects a gateway or another access node as an upstream device, informs that upstream device that the access node is connected to the upstream device. The access node also informs the upstream device of all downstream devices connected to the access node. Therefore, all of the access nodes and gateways can form routing tables that include all downstream devices. Once the routing tables have been formed, each gateway can determine the size of its cluster, including all access nodes and client devices within and connected to the cluster.

FIG. 1 also includes a management server 192 that can collect and monitor metrics of the wireless mesh network. The mesh network metrics can include both performance metrics and utilization metrics. The mesh network metrics can be collected by the access nodes and conveyed to the management server. One embodiment of the management server generates a list of access nodes within the wireless mesh network that are good candidates for conversion to a gateway. The management server can convey the list to a network operator by ranking the desirability of the conversion of each of the access nodes. The network operator can then update and convert the selected or recommended access nodes according to the ranked list. An alternate embodiment includes the management server instructing the selected or recommended access nodes to self-convert themselves into gateways. This can be performed, for example, by including an extra radio that can be used for backhaul. The extra radio is only used when the access node is being utilized as a gateway.

Examples of performance metrics include access node downstream throughput, upstream throughput, latency and hop count. Downstream throughput is typically defined by the amount of data that can be transferred from the cluster gateway to the access node over a period of time. The upstream throughput is typically defined by the amount of data the access node is able to communication upstream to its cluster's gateway over a period of time. Latency is typically defined as the time required for data to be transmitted from one network location to another location. Latency of an access node is defined as the time taken from the sending of a packet to (or from) the access node from (or to) the cluster's gateway. In a pre-deployment network, these metrics (upstream and downstream throughput and latency) characterize the raw performance of the mesh network. In an operational (post-deployment) network, with data traffic from end-users occupying the mesh links, these metrics characterize the effective network headroom (available capacity in the presence of the existing load).

One embodiment includes the access node determining its downstream and upstream throughput by executing a throughput test between the access node and its cluster's gateway. One embodiment includes a gateway determining downstream and upstream throughputs for access nodes in its cluster by executing throughput tests with each of the access nodes in the cluster as the traffic end-point. The throughput tests can be performed using commercially available throughput measurement tools such as Iperf or nuttcp.

One embodiment includes the access node determining its latency by sending a packet to its cluster's gateway, receiving a packet from the gateway in response, measuring the interval between transmission of the first packet and reception of the second packet and halving this round-trip time to determine a one-way delay or latency.

Examples of utilization metrics include data traffic through the access node, air-time utilization at the access node, a number of downstream routers of the access node, and a number of downstream clients of the access node. Air-time utilization is typically defined by the fraction of time that the channel is sensed as being busy. The channel can be busy for a variety of reasons including the medium being busy because of other transmissions being in progress, external radio frequency interference, etc. Carrier-sense multiple access (CSMA) as employed in the 802.11 standard requires an access node to refrain from transmitting if the medium is sensed as being busy. One embodiment includes determining the air-time utilization of the access node by measuring the fraction of time that the medium is sensed as being busy, averaged over some time-scale. The number of downstream access nodes and downstream clients can be determined from the previously described routing tables.

Based on the mesh network metrics, intelligent decisions of which access nodes to convert to gateways can be made. Each access node can monitor its mesh network metrics. The mesh network metrics can be reported to a network server, such as, the management server 192. Based on the mesh network metrics of the access nodes of the wireless mesh network, the management server 192 can suggest which access nodes are preferred candidates for conversion to gateways. The conversions can improve the performance of the wireless mesh network by, for example, balancing the loading of the wireless mesh network, improving system capacity, reducing average hop count, increasing throughputs and decreasing latencies within the mesh network. As previously mentioned, the conversion can be automatically made by the access nodes, or a network operator can implement the conversions.

Figure 2:
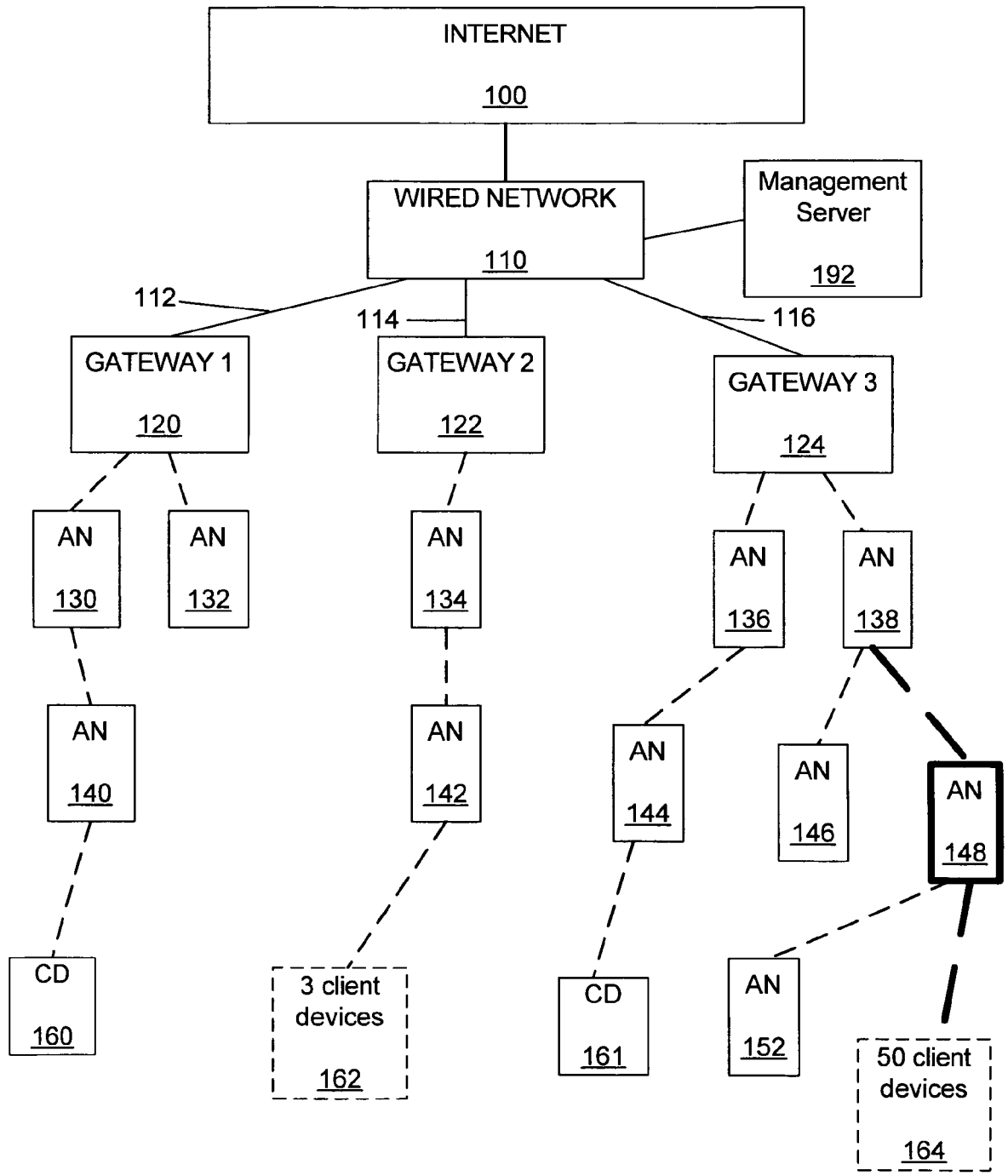
FIG. 2 shows the wireless mesh network of FIG. 1 in which an access node has been identified as a candidate for conversion to a gateway.

FIG. 2 shows the wireless mesh network of FIG. 1 in which an access node is identified as a candidate for conversion to gateway. More specifically, the management server 192 suggests that the access node 148 is a top candidate for conversion to a gateway based on the mesh network metrics of the access node 148. That is, for example, the management server 192 monitors the wireless mesh network metrics of the access nodes of the wireless mesh network. The access node 148 has 50 downstream client devices. Therefore, the access node 148 is likely to be more stressed than the other access nodes of the wireless mesh network as reflected by the mesh network metrics. The access nodes has a relatively higher hop count, has more downstream client devices, and likely has lesser throughput than the rest of the access nodes.

Figure 3:
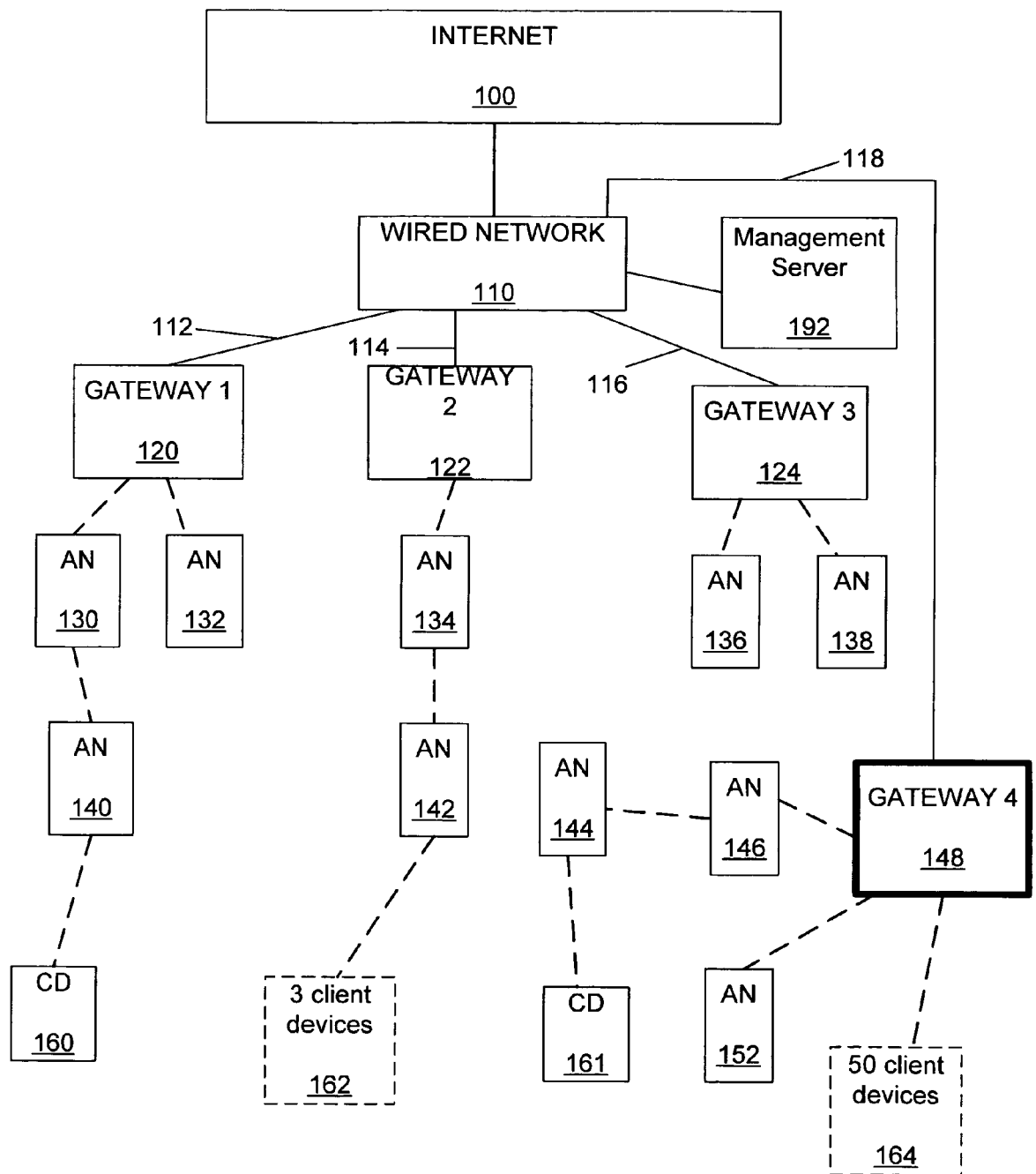
FIG. 3 shows the wireless mesh network after an access node has been converted to a gateway, and shows an example of resulting routing through the wireless mesh network.

FIG. 3 shows the wireless mesh network after the access node 148 has been converted to a gateway (still designated as 148), and shows an example of resulting routing through the wireless mesh network. Once the access node 148 has been updated to being a gateway 148, the routing selections of the wireless mesh network typically change. A new backhaul connection 118 is formed between the gateway 148 and the wire network 110. The backhaul can be put into place by a network operator, or the backhaul can be wirelessly implemented automatically by the gateway 148 through a spare radio of the gateway 148.

An embodiment of the management server provides predictions of how the routing will occur once the conversion has been implemented. Additionally, the management server provides a predictive analysis of what the network performance metrics of the access nodes will be once the conversion has taken place.

One embodiment of the prediction of the routing selections includes projecting the persistence of routing packets broadcast from the gateway 148 that are successfully received by new first-order access node (new with respect to the newly converted gateway). The projected routing selections can alternatively or additionally include at least one of projected reverse routing packet persistence, access node hop count, and/or the size of the cluster broadcasting the routing beacon. The reverse routing packet persistence can be determined by estimating how many routing beacons are successfully received by the upstream device. The hop count and the cluster size can be determined from routing tables, and are included within the routing beacons.

Figure 4:
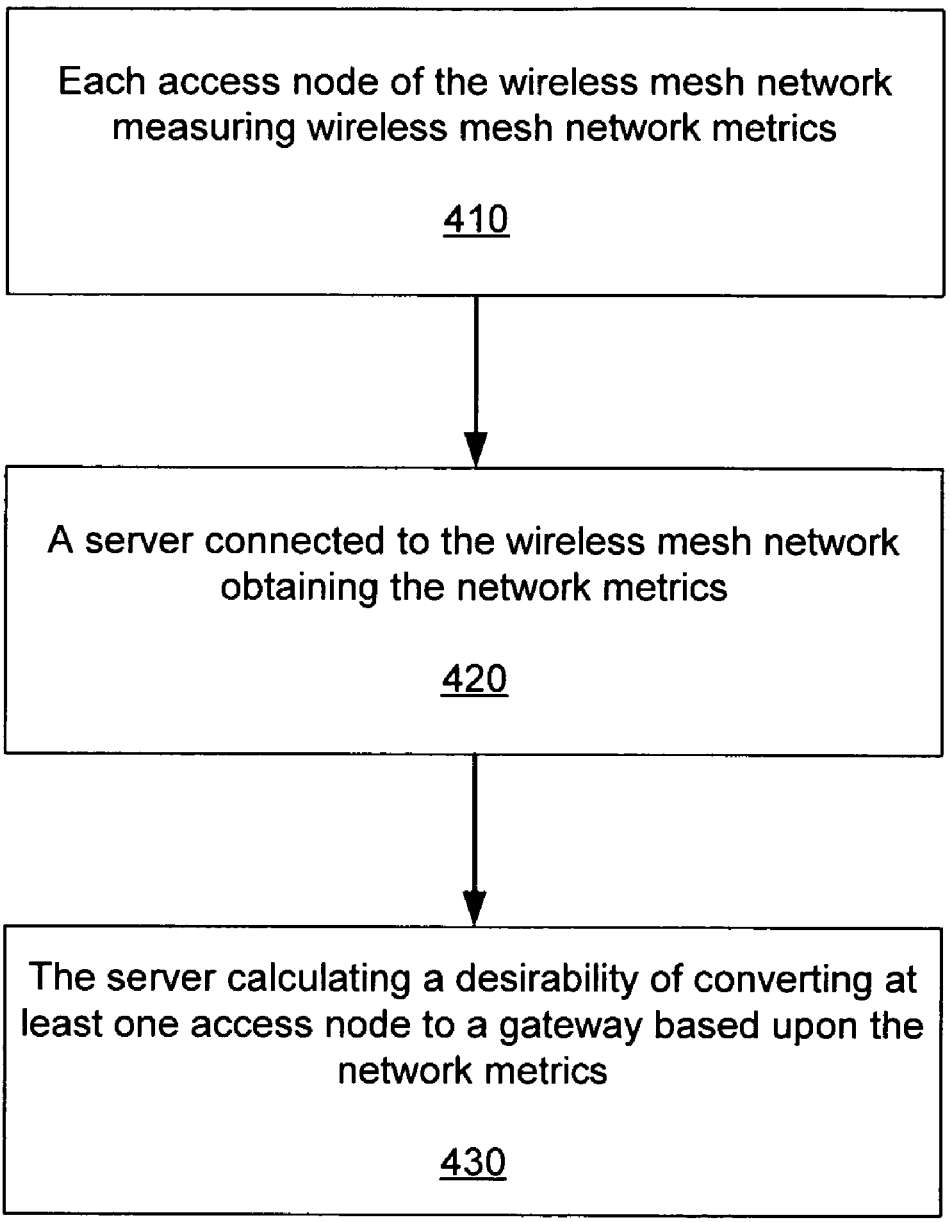
FIG. 4 is a flow chart that includes steps of an embodiment of a method of a wireless mesh network proposing access nodes for conversion to gateways.

FIG. 4 is a flow chart that includes steps of an embodiment of a method of a wireless mesh network proposing access nodes for conversion to gateways. A first step 410 includes each access node of the wireless mesh network measuring wireless mesh network metrics. A second step 420 includes a server connected to the wireless mesh network obtaining the network metrics. A third step 430 includes the server calculating a desirability of converting at least one access node to a gateway based upon the network metrics.

The server retrieves the mesh network metrics from each of the access nodes. In one embodiment, each gateway gathers mesh network metrics from the nodes in its cluster and these metrics are then conveyed to the management server. In one embodiment, each gateway gathers mesh network metrics from the nodes in its cluster and these metrics are gathered by the management server from the gateways. In one embodiment, each access node gathers mesh network metrics and sends these metrics to the management server. The server (such as, the previously described management server 192) provides suggested access node conversions to a network operator. The network operator can then convert the access node to a gateway. This can be accomplished by provisioning a backhaul connection to the access node to convert it to a gateway. Backhaul connections can include one of point-to-point wireless links, point-to-multipoint wireless links, fiber connections, T-1 lines, or other connection technologies.

As previously mentioned, an alternate embodiment includes the management server instructing the selected, suggested or recommended access nodes to self-convert themselves into gateways. This can be performed, for example, by including an extra radio that can be used for backhaul. The extra radio is only used when the access node is being utilized as a gateway.

As previously described, exemplary mesh network parameters include performance metrics and utilization metrics of one or more of the access nodes. The performance metrics can be obtained by measuring at least one of access node downstream throughput, upstream throughput, latency and hop count. For an embodiment, the performance metrics are measured over a period of time (such as, a number of predetermined hours). The performance metrics provides an indication when the performance metric does not meet a threshold for the period of time. For example, an embodiment of the performance metric indicates when the downstream or upstream throughput was below a predetermined threshold for at least a predetermined number of hours. Additionally or alternatively, an embodiment of the performance metric includes indicating when a latency of the access node is greater than a predetermined threshold for a predetermined amount of time, or when the hop count of the access node exceeds a predetermined number for a period of time.

The utilization metrics can be obtained from each of the access nodes as well. Examples of access node utilization metrics include data traffic through the access node, air-time utilization, a number of downstream routers of the access node, a number of downstream clients of the access node.

The access node utilization metric can additionally include a weighting by a number of routers and/or client devices downstream of the access node. Nodes that have a large number of downstream routers and/or downstream clients have a greater value for the utilization metric.

For one embodiment, the utilization metrics are expressed by a number of hours that data traffic through the node is above a threshold, or air-time utilization at the node is above a threshold.

An access node can be identified as a candidate for conversion by determining a metric value according to the following exemplary equation for the access node:

M=[# of hours of downstream throughput below a threshold at the access node+#of hours of upstream throughput below a threshold at the access node+#hours of high latency above a threshold at the access node+#hours of high hop count above a threshold at the access node+#of hours of a high number of downstream clients greater than a threshold at the access node]*[An average number of downstream clients].

A metric value (M) is generated for every access node within the wireless mesh network. The access nodes can be ranked according to the value of their resulting metric. Those having a metric value greater than a threshold can be suggested candidates for conversion.

The server can provide the conversion recommendations by forming a ranked list of the nodes for conversion based on the performance and utilization metrics.

Additional embodiments include the management server predicting a network topology based upon the desired access node conversions. That is, the management server predicts the routing selections that would be made if the conversion is implemented. Data gathered from the nodes includes wireless link qualities for links between access nodes. Routing choices can be based on end-to-end path metrics that can be constructed for each available path based on knowledge of the individual link qualities for the links comprising each available path. The management server can use the gathered data from the access nodes to predict the routing decisions that would be made if the suggested access nodes were converted to gateways. Based on the predicted routing selections, the management server provides a prediction of performance metrics of the wireless mesh network if suggested access node conversions are implemented. Generally, the predicted performance metrics are based on at least one of path downstream packet success rate, path upstream packet success rate, hop count and cluster size.

Figure 5:
FIG. 5 is a flow chart that includes steps of an embodiment of a method of a server of a wireless mesh network calculating which access nodes of the wireless mesh network should be converted to gateways.

FIG. 5 is a flow chart that includes steps of an embodiment of a method of a server of a wireless mesh network calculating which access nodes of the wireless mesh network should be converted to gateways. A first step 510 includes the server receiving wireless mesh network metrics from the access nodes. A second step 520 includes the server calculating which of the access nodes should be converted based upon the network metrics.

The methods of proposing or calculating access nodes for conversion to gateways can be implemented as a computer program that is operable on the server that is connected to the wireless network. Based on the suggested conversions, a system operator can convert the suggested access nodes to gateways.

An alternate embodiment includes the access nodes being configured so that they can automatically convert themselves into gateways. The access nodes can be configured, for example, with an extra backhaul radio (transceiver) which is utilized when the access node is being used as a gateway.

Although specific embodiments of the invention have been described and illustrated, the invention is not to be limited to the specific forms or arrangements of parts so described and illustrated. The invention is limited only by the appended claims.

What is claimed:

1. A method of a wireless mesh network proposing access nodes for conversion to gateways, comprising:
    each access node of the wireless mesh network measuring wireless mesh network metrics;
    a server connected to the wireless mesh network obtaining the wireless mesh network metrics;
    the server calculating a desirability of converting at least one access nodes to a gateway based upon the wireless mesh network metrics;
    the server generating a list of the at least one access node within the wireless mesh network that are good candidates for conversion to a gateway, and ranking a desirability of conversion of each access node of the list; and
    the server providing the list to a network operator.

2. The method of claim 1, wherein the mesh network metrics comprise performance metrics and utilization metrics.

3. The method of claim 2, wherein obtaining the performance metrics comprises measuring at least one of access node downstream throughput, upstream throughput, latency and hop count.

4. The method of claim 3, wherein the performance metrics comprise a number of hours the measured performance metric does not meet a threshold.

5. The method of claim 2, wherein the access node utilization metrics comprise at least one of data traffic through the access node, air-time utilization at the access node, a number of downstream routers of the access node, a number of downstream clients of the access node.

6. The method of claim 5, wherein the access node utilization metric further comprises a weighting by a number of routers downstream of the access node.

7. The method of claim 5, wherein the access node utilization metric further comprises a weighting by a number of client devices downstream of the access node.

8. The method of claim 5, wherein the utilization metric further comprises a number of hours data traffic is above a threshold, or air-time utilization is above a threshold.

9. The method of claim 2, further comprising forming a ranked list of the nodes for conversion based on the performance and utilization metrics.

10. The method of claim 1, further comprising:
    the management server predicting a network topology based upon the desired access node conversions.

11. The method of claim 10, further comprising:
    the management server providing prediction of performance metrics of the wireless mesh network if suggested access node conversion are implemented.

12. The method of claim 11, wherein the prediction of performance metrics are based on at least one of downstream packet success rate, upstream packet success rate, hop count and cluster size.

13. A method of a server of a wireless mesh network calculating which access nodes of the wireless mesh network should be converted to gateways, comprising:
    the server receiving wireless mesh network metrics from the access nodes;
    the server calculating which of the access nodes should be converted based upon the network metrics;
    the server generating a list of the at least one access node within the wireless mesh network that are good candidates for conversion to a gateway, and ranking a desirability of conversion of each access node of the list; and
    the server providing the list to a network operator.

14. The method of claim 13, wherein the mesh network metrics comprise performance metrics and utilization metrics.

15. The method of claim 14, wherein obtaining the performance metrics comprises measuring at least one of access node downstream throughput, upstream throughput, latency and hop count.

16. The method of claim 15, wherein the performance metrics comprise a number of hours the measured performance metric does not meet a threshold.

17. The method of claim 15, wherein the access node utilization metric further comprises a number of hours data traffic is above a threshold, or air-time utilization is above a threshold.

18. The method of claim 14, wherein the access node utilization metrics comprise at least one of data traffic through the access node, air-time utilization, a number of downstream routers of the access node, a number of downstream clients of the access node.

19. The method of claim 18, wherein the access node utilization metric further comprises a weighting by a number of routers downstream of the access node.

20. The method of claim 18, wherein the access node utilization metric further comprises a weighting by a number of client devices downstream of the access node.

21. The method of claim 14, further comprising forming a ranked list of the nodes for conversion based on the performance and utilization metrics.

22. The method of claim 13, further comprising:
the management server predicting a network topology based upon the desired access node conversions.

23. The method of claim 22, further comprising:
the management server providing prediction of performance metrics of the wireless mesh network if suggested access node conversion are implemented.

24. The method of claim 23, wherein the prediction of performance metrics are based on at least one of downstream packet success rate, upstream packet success rate, hop count and cluster size.

* * * * *